United States Patent [19]
Warner

[11] 4,097,141
[45] Jun. 27, 1978

[54] OPTICAL OBJECTIVES USING APERTURED RETRODIRECTIVE REFLECTORS

[76] Inventor: David A. Warner, 100 Memorial Dr., Cambridge, Mass. 02142

[21] Appl. No.: 778,212

[22] Filed: Mar. 16, 1977

Related U.S. Application Data

[63] Continuation-in-part of Ser. No. 568,939, Apr. 17, 1975, abandoned.

[51] Int. Cl.$^2$ .................. G02B 17/00; G02B 23/06
[52] U.S. Cl. .................................. 350/27; 350/36; 350/55; 350/102; 350/104; 350/199; 350/201
[58] Field of Search ................ 350/27, 29, 199–201, 350/55, 97, 102, 104, 36

[56] References Cited
U.S. PATENT DOCUMENTS
3,397,024  8/1968  Boyden .................. 350/199
FOREIGN PATENT DOCUMENTS
147,809  11/1962  U.S.S.R. .................. 350/199

Primary Examiner—Jon W. Henry
Attorney, Agent, or Firm—Schiller & Pandiscio

[57] ABSTRACT

The invention is a new telescopic optical system that comprises an entrance pupil, a main mirror in the form of a truncated corner reflector disposed so that its base faces said entrance pupil, and a secondary mirror, said mirror being arranged so that said main mirror receives light admitted by said entrance pupil and reflects it back to said secondary mirror and said secondary mirror reflects said same light back through the truncated section of said main mirror.

17 Claims, 15 Drawing Figures

OPTICAL OBJECTIVES USING APERTURED RETRODIRECTIVE REFLECTORS

This application is a continuation-in-part of my copending application Ser. No. 568,939 filed Apr. 17, 1975, for OPTICAL OBJECTIVES now abandoned. This invention relates to optical objectives and more particularly to improved objectives for telescopic optical systems, binoculars, field and opera glasses, and other related viewing instruments.

A variety of optical systems comprising refracting and reflecting elements have been designed and used in the manufacture of telescopes, binoculars, opera glasses and similar viewing instruments, as exemplified by U.S. Pat. Nos. 2,166,102, 2,504,383, 2,413,286, 2,317,270, 3,064,526, 3,468,597 and 3,552,819, and the references cited in the files of said patents. A number of such prior systems employ Cassegrainian and Gregorian objectives. The Cassegrainian objective comprises a concave main mirror and a convex secondary or collecting mirror while the Gregorian system uses a concave main mirror and a concave collecting mirror. In both cases, the collecting mirror serves to reflect light rays coming from the main mirror back through an aperture in the main mirror for reception by an ocular or eyepiece. To eliminate inherent errors, it is necessary with both systems to give the main and secondary mirrors aspherical surfaces. It also has been contemplated to design telescope objectives that use only spherical reflecting surfaces and which nevertheless have correction for chromatic and spherical aberrations and also coma. One such objective is shown in U.S. Pat. No. 2,817,270 wherein the main and secondary mirrors are Mangin mirrors. As is well known in the art, the term "Mangin mirror" refers to a mirror that combines a positive spherical reflector with a negative refracting element having a spherical surface, the combination having an overall positive power. In practice the reflector coincides with one surface of the refractive element and takes the form of a coating of a reflective material such as silver or aluminum. An advantage of the Mangin mirror is that the composition (which determines its index of refraction), thickness and radii of curvature of its refracting element provide variables for correction of aberrations.

Nevertheless, as applied to binoculars and the like, such prior telescope objectives suffer from one or more limitations such as a narrow field of view, high cost of manufacture, critically precise positioning and alignment of optical elements, use of prisms or other elements to obtain an erect image, and severe constraints on correction of aberrations. Furthermore, such instruments cannot be comfortably worn in the manner of spectacles because of excessive weight and improper location of the center of gravity dictated by the overall length of the optical system and the arrangement and relative sizes of the optical components.

Accordingly, one object of this invention is to provide an optical system that makes possible the manufacture of telescopes, binoculars and optical instruments of similar purpose which are light weight, compact, relatively inexpensive and substantially free of misalignment problems.

Another important object is to provide an optical system for telescopes, binoculars and the like that is fully corrected for spherical and chromatic aberrations and other errors such as coma, astigmatism, etc.

Still another object is to provide an optical system whose optical elements can be made of plastic.

A further important object is to provide an optical system for the purposes described which is capable of erecting an image at zero power so that no aberration is introduced by such erection.

Another object is to provide a telescopic optical system which is constructed so that the image is erected and focused before the eyepiece, thereby facilitating avoidance and correction of aberrations and other errors. A related object is to provide an optical system of the character described wherein color correction may be achieved in the eyepiece rather than in the objective.

Still another object is to provide a pair of binoculars that are adapted to be worn in the manner of spectacles, provide a satisfactory field of view, have a real image plane inside the instrument, and exhibit superior image stability in comparison to other optical systems of similar intent.

Another object is to provide a device which is afocal when used with an eye-piece and which allows an erect magnified image to be viewed by an eye which is focussed for a distant object.

A further object is to provide a telescope that may but need not utilize aspheric reflectors.

Another object is to provide a novel telescope system that includes a concave primary mirror which may but need not be of the Mangin-type.

A more specific object is to provide a novel optical system that utilizes a retrodirective reflector for forming a real image plane within the system.

The foregoing objects and other objects hereinafter disclosed or rendered obvious are achieved by a system which in its preferred embodiment comprises a multi-element objective that includes a main mirror and a secondary mirror, with said main mirror being in the form of a truncated solid or hollow corner reflector and disposed so as to receive light from an entrance pupil and reflect it back to said secondary mirror, and said secondary mirror functioning to reflect the same light back to the truncated section of the main mirror. Other features and many of the attendant advantages are set forth in or rendered obvious by the following description which is to be considered together with the accompanying drawings wherein:

In the drawings, like numerals are used to designate like parts.

Figure 1:
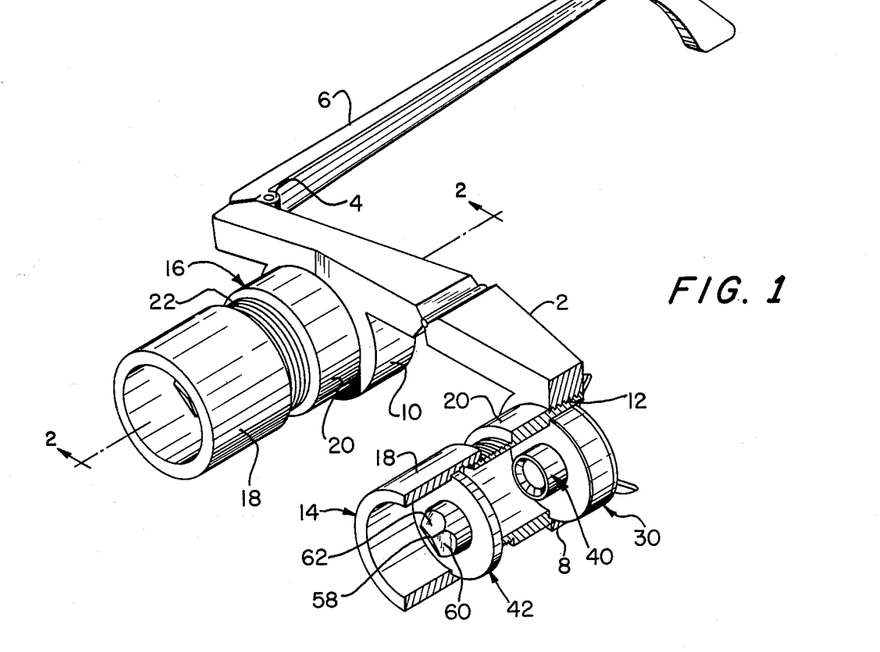
FIG. 1 is a fragmentary perspective view, partly in section, of binoculars embodying one form of the invention.
Figure 2:
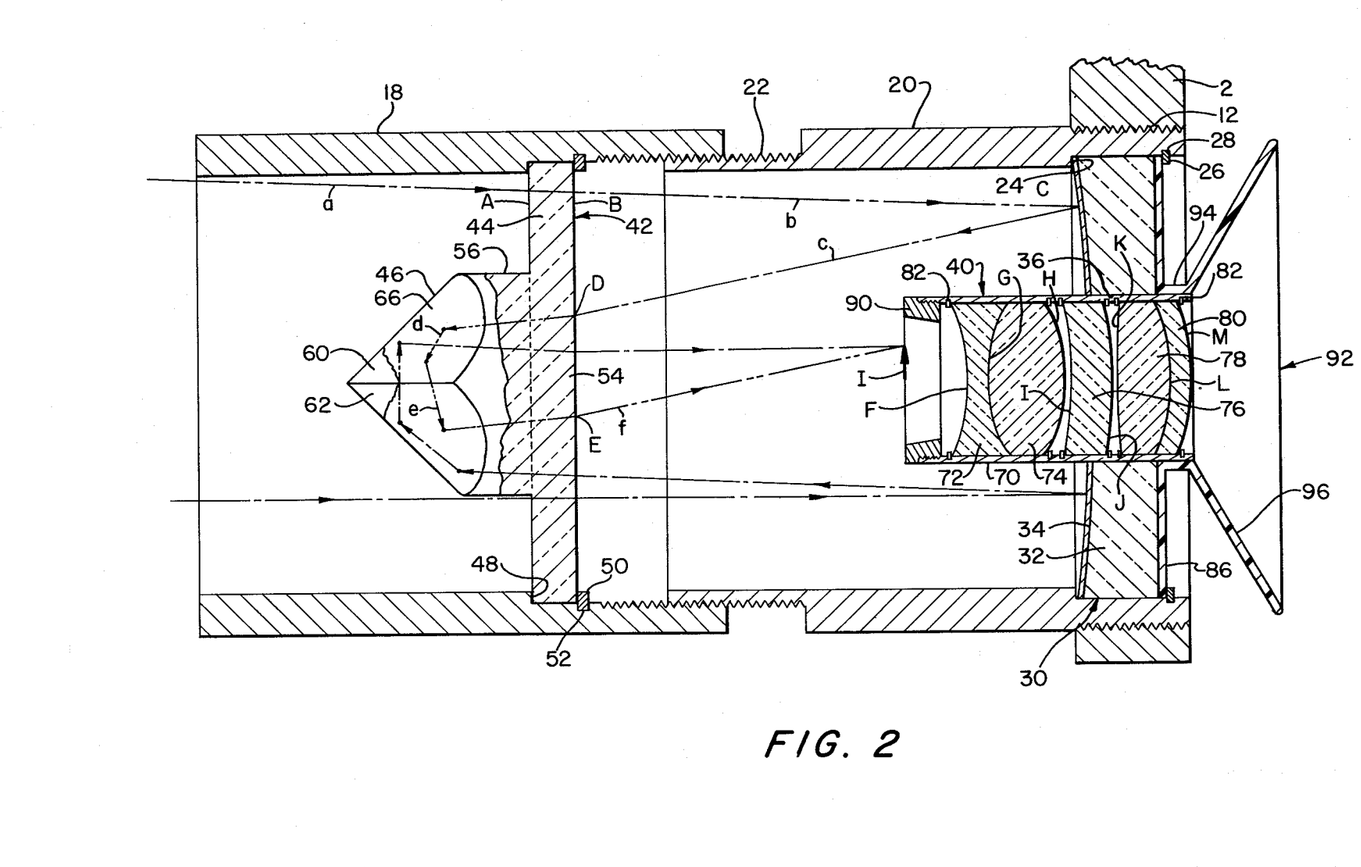
FIG. 2 is a longitudinal sectional view in elevation, taken substantially along line 2—2 of one of the two optical systems embodied in the binoculars of FIG. 1.

Turning now to FIGS. 1 and 2, this embodiment of the invention is a pair of binoculars that may be worn in the manner of spectacles. The binoculars comprise a bridge or frame 2 provided at its opposite ends with hinge elements 4 to which are connected a pair of bows or temple bars 6 (only one each of the hinge elements and bows are shown since one end of the bridge is broken away to illustrate certain elements of one of the dual telescopes that comprise the binoculars). In accordance with this preferred mode of practicing the invention, the bridge and bows are made of a suitable strong light weight plastic material. Also, although not shown, the bridge may be provided with a pair of nose-engaging members for supporting the frame on the wearer's nose, as in a conventional pair of spectacles. The bridge 2 is formed with two like depending tubular extensions or collars 8 and 10 which are internally threaded as shown at 12 to receive and secure the threaded rear end sections of like tubular-shaped telescope housings 14 and 16 that house like optical systems which are described hereinafter.

Referring now to FIG. 2, the housings 14 and 16 each comprise a cylindrical front section 18 and a cylindrical rear section 20. The front sections 18 fit over the rear sections 20 and the rear end of each section 18 is internally threaded to mate with external threads 22 formed on the front ends of sections 20. By virtue of such screw connections, the two sections of each housing may be telescoped to increase or decrease the length of the housing. A spherical main mirror 30 is mounted within each section 20 at its rear end. Each section 20 has an internal shoulder 24 against which the main mirror is secured by an internal type retaining ring 26 seated in a groove 28. Mirror 30 comprises a transparent spherically curved disc 32 provided with a reflective surface coating 34 on its concave side. Mirror 30 is mounted coaxial with the housing. Mirror 30 also is annular, being characterized by a circular center hole 36 that is aligned with the axis of the associated tubular housing section 20. Affixed in hole 36 of each mirror 30 is a conventional ocular or eyepiece system 40. Details of the eyepiece optical system shown in the drawings are described hereinafter. Mounted within the cylindrical front section 18 of each housing is a unitary optical assembly 42 which constitutes an entrance pupil and also a retro-directive reflector. More specifically, assembly 42 comprises a transparent plate 44 and a retro-directive reflector in the form of a corner cube element 46. Plate 44 engages an internal shoulder 48 of housing section 18 and is secured in place by an internal type retaining ring 50 which is locked in a groove 52 formed in the housing section. Preferably plate 44 is located short of the front end of housing section 18 so that the portion of the housing section in advance of plate 44 functions as a light stop. Alternatively, plate 44 may be located closer to the front of the housing section 18 and a light stop extension may be attached to the front end of the housing.

Plate 44 has planar front and rear surfaces and may be considered to comprise an annular plano-plano zonal portion that serves as an entrance pupil and surrounds and is integral with a central refractive portion 54 that serves as a support for corner cube element 46. The latter may be formed separately from plate 44 and joined thereto by a suitable light-transmitting cement. Preferably, however, corner cube element 46 and plate 44 are formed as one piece. In the embodiment shown in FIGS. 1 and 2, corner cube element 46 consists of a solid cylindrical section 56 and an integral corner cube section consisting of three surfaces 58, 60 and 62 that form a regular three-sided pyramid, i.e. a 90° trihedral. By way of example, the above described optical assembly may be made by forming a single glass or plastic optical blank which consists of a cylindrical rod corresponding to cylindrical section 56 and a plate like plate 44, and then machining or grinding the outer end of the cylindrical rod so as to form the three surfaces 58, 60 and 62, whereby the boundaries of the three flat surfaces and the remainder of the cylindrical rod are curved or scalloped as shown. Alternatively the optical assembly just described may be molded. In any event, the apex of the corner cube section is aligned with an optical axis of mirror 30 and is coaxial with plate 44. Preferably, but not necessarily the surfaces 58, 60 and 62 may be coated with a reflective material 66 to enhance reflection and/or to eliminate stray light.

Each eyepiece system comprises a cylindrical barrel 70 which is mounted in the center hole 36 of the associated main mirror 30. Barrel 70 may be secured to main mirror 30 by suitable means such as a cement. Mounted within barrel 70 are five lenses constituting a modified Erfle eyepiece. More specifically, the eyepiece comprises a front achromatic doublet consisting of a concave-concave lens 72 and a convex-convex lens 74, a concave-convex center lens 76, and a rear achromatic doublet consisting of a plano-convex lens 78 and a concave-convex lens 80. Other well-known eyepiece designs, such as the symmetrical or Plossl eyepiece, may also be used (see W. J. Smith, *Modern Optical Engineering*, pp. 357–361, McGraw-Hill, 1966 and Jenkins & White, *Fundamentals of Optics*, pp. 181–183, McGraw-Hill, 1957). The front doublet, the center lens, and the rear doublet are held in place by internal type retaining rings 82 mounted in grooves in barrel 70. The front and rear doublets are spaced from the center lens as shown. The front end of barrel 70 extends forward of the front doublet and is internally threaded to receive a short conically-tapered light stop 90 which serves to prevent light that enters the system via the entrance pupil from passing directly to the eyepiece without reflection from the main mirror and the corner cube. Mounted to the rear end of each barrel 70 is a light shade 92 comprising a cylindrical section 94 that surrounds and tightly grips the barrel, a circular disk section 86 that engages the rear side of mirror 30 and is held in place by retaining ring 26, and a tapered flange 96 that cups the wearer's face around the corresponding eye.

To summarize, from a functional standpoint the system shown in FIG. 2 may be considered to comprise the following: (a) a refractive entrance pupil consisting of the annular zonal portion of plate 44 (alternatively, the front stop 18 may act as the entrance pupil if the annular zonal portion of plate 44 is omitted and the corner cube element 46 is supported by a non-refractive spider), (b) a main concave reflector in the form of mirror 30, (c) a retro-directive reflector in the form of corner cube element 46 for producing a real and erect image that is the object for the eyepiece, and (d) an eyepiece in the form of lenses 72–80 which functions as a magnifier and forms a large virtual image at infinity which becomes the object for the eye itself and is transformed into a real image on the retina of the eye. Preferably all of the corrections for spherical and color aberrations and also for astigmatism, distortion, etc. are achieved in each eyepiece by proper design of its optical elements. However, if desired, the front optical assembly may be modified by reshaping either or both of the front and rear surfaces of the zonal portion of plate 44 so that it serves as a lens that introduces a predetermined correction; also an additional lens or lenses may be associated with the zonal portion of plate 44 so as to provide a compound refractor such as a doublet or triplet that provides appropriate corrections. It also is contemplated that such modifications may be designed so that the entrance pupil also functions as a magnifier. Preferably, however, all magnification is achieved by the eyepiece.

The path of light rays in the system of FIG. 2 is as follows: A light ray $a$ coming from an object passes through the zonal portion of plate 44 and proceeds as $b$ until it is reflected by main mirror 30 and travels as $c$ to and through the central portion of plate 44 and the cylindrical sections of element 46 to one of the surfaces 58 of the corner cube reflector, where it is reflected and directed as $d$ to a second surface 60 of the corner cube reflector. The ray is reflected from surface 60 and directed as $e$ to the third surface 62 of the corner cube, from whence it is reflected as $f$ to the eyepiece. The image indicated by arrow $i$ is real and erect. Since the image plane is within the system, notably in front of the main or primary mirror, the overall physical length of the system is relatively short and the design of the eyepiece is simplified.

It is to be noted that the corner cube reflector has the characteristic property of returning a ray of light on a path exactly parallel to but spaced from that of the incident ray, since at each surface the angle of reflection equals the angle of incidence. This property is well known and is illustrated by R. Kingslake, "Applied Optics and Optic Engineering", p. 323-333, Academic Press, 1967 and Scientific American, March 1970, page 42. Accordingly, the path $f$ followed by the light ray in FIG. 2 is parallel to but laterally displaced from the path $c$ followed by the light ray in its transit from the main mirror to the corner cube reflector.

Figure 3:
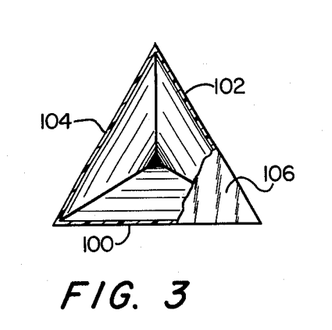
FIG. 3 is a sectional view of a corner reflector element intended for use in the present invention.

It is to be appreciated that the retro-directive reflector may be a solid or hollow corner reflector. Thus, as shown in FIG. 3, the retro-directive reflector may be a hollow corner reflector element consisting of three flat walls 100, 102 and 104 disposed in the manner of the sides of a regular three-sided pyramid. The base of the pyramid may be open or may be closed off as by a transparent wall 106.

Figure 4:
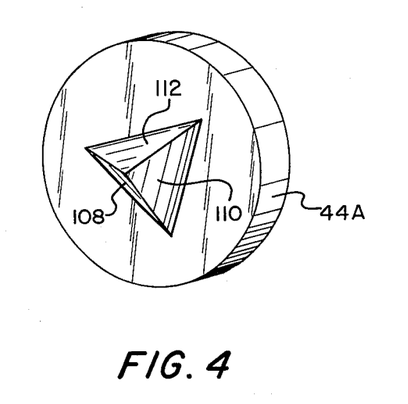
FIG. 4 is a perspective view of a modification of the front optical assembly.

It is to be appreciated also that the three surfaces constituting the corner reflector may terminate exactly at the front surface of the plate 44. This modification is illustrated in FIG. 4 where the three surfaces 108, 110 and 112 of the corner reflector terminate at the front surface of plate 44A. Obviously, the corner reflector element in FIG. 4 may be solid or hollow. Also, the surfaces 100-104 and 108-112 may be coated with a reflective material so as to enhance reflection.

It is also contemplated that the invention may be modified by replacing the corner cube reflector with a so-called "cat's eye" lens such as that described on Page 322, Volume 4 of the Applied Optics and Optical Engineering Text cited above.

For the purpose of this invention, it is to be noted that the terms "corner cube reflector", "corner reflector", "corner cube mirror" and "triple mirror reflector" are intended to be synonymous, and the terms "solid" and "hollow" are employed to distinguish between the two general types of corner reflectors shown in FIGS. 3 and 4. The term "retro-directive reflector" denotes reflectors in which light incident to the reflector is reflected in such a manner that the reflected ray in parallel or nearly so, allowing for mechanical manufacturing tolerances, to the original ray and generally displaced from it, and encompasses both triple mirror or corner reflectors and "cat's eye" lenses. The "cat's eye" lens differs from the corner reflector in that it forms an intermediary image inside of the lens proper and thus operates at unit power whereas the corner reflector has no such intermediary image and thus operates nominally at zero power.

Figure 5:
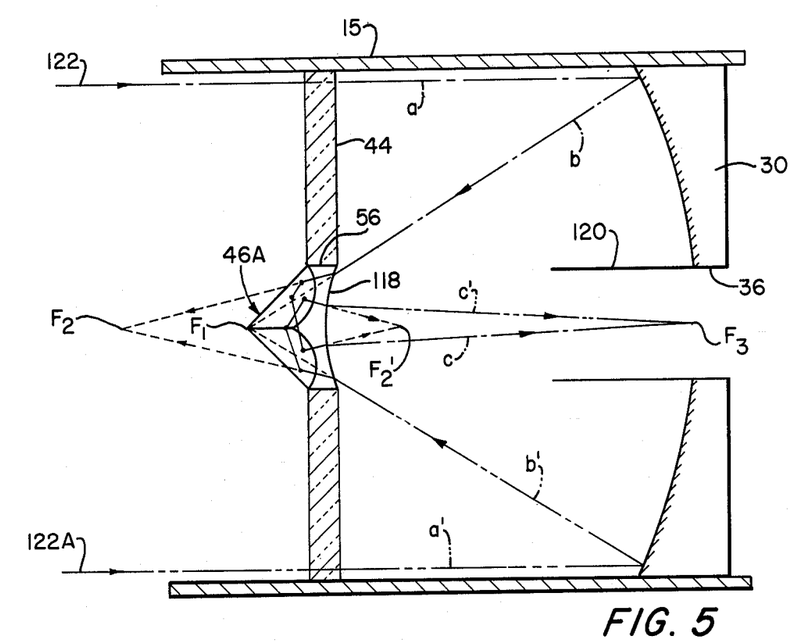
FIG. 5 is a sectional view of another modification of the system of FIG. 2.

Referring now to FIG. 5, the illustrated embodiment comprises a tubular housing 15, a spherical main mirror 30 as previously described, plus a unitary front optical assembly which comprises a corner cube element 46a which is mounted coaxially with the main mirror by suitable light transmitting means such as a transparent plate 44. The latter and main mirror 30 are both secured to the tubular housing by suitable means (not shown) and the tubular housing may be made in two parts corresponding to the sections 18 and 20 shown in FIG. 2. Corner cube element 46A is exactly like corner cube element 46 of FIG. 2 except that the plate 44 is co-planar with the cylindrical section 56 of the corner cube and the rear side of the latter is formed with a concave surface 118. An opaque tubular stop or diaphragm 120 is mounted to the front side of the main mirror in concentric relation to its center hole 36. A magnifier, i.e., eyepiece, (not shown) may be mounted within diaphragm 120 just as the eyepiece of FIG. 2 is mounted within barrel 70; alternatively, the eyepiece may be located behind mirror 30.

As will be obvious to a person skilled in the art, the front optical assembly of the system of FIG. 5 is a compound negative retroreflector which is characterized by the fact that the concave surface 118 behaves as a telephoto element since it provides magnification when the light rays pass into the corner reflector 46A and again when the reflected rays pass out of the latter element back toward the center of the main mirror. More specifically, corner cube element 46A behaves like a thick negative telephoto lens with the added function of image erection. Except for the additional magnifying power afforded by concave surface 118, the system of FIG. 5 functions much like the system of FIG. 2. The path of light rays in the system of FIG. 5 is exemplified by those followed by the two incident light rays 122 and 122A. The path of light ray 122 is as follows:

First it passes through plate 44 and proceeds as $a$ to main mirror 30 where it is reflected and passes as $b$ into the corner cube via its concave surface 118. Then the ray is reflected in turn from each of the three flat reflecting surfaces of the corner cube and passes as $c$ out of the concave surface 118 to the center hole 36 of the main mirror. The other light ray 122A follows a similar path and emerges from the corner cube toward the center hole 36 of the main mirror as $c'$. The light rays converge at a final focus point $F_3$. The image (which is real and erect) formed at $F_3$ is magnified by the associated eyepiece or magnifier (not shown). $F_1$ represents the focal point of the main mirror, $F_2$ is the image plane that would be formed by light rays passing from main mirror 30 through the corner cube on the first encounter with the corner cube, $F_2'$ is the image plane that would be formed by light rays passing out of the corner cube after encountering the three mutually orthogonal surfaces of the prism, and $F_3$ is the final focus of the system, i.e., it is the surface or plane at which the real and erect image is formed. In FIG. 5, the focal point $F_1$ coincides with the apex of the corner cube; however, this is not a fundamental functional requirement of the invention. An essential requirement of this embodiment is that the virtual focus of the corner cube cannot coincide with the focus of the main mirror; instead the focus of the main mirror must be between surface 118 and the virtual focus of the corner cube; preferably it is between the apex of the corner cube and surface 118. The virtual focus of the corner cube is affected by the curvature of surface 118. The latter is spherical and its curvature is arranged so as to substantially balance out spherical aberrations of the main mirror. The final focus $F_3$ of the system may be moved forward or behind the particular point shown in FIG. 5 by appropriate design of surface 118.

The compound negative retroreflector of the system of FIG. 5 offers the advantage of a smaller central obscuration and shorter physical length for a given effective focal length. It offers the advantage of a Barlow or telephoto lens with the added advantage of image erection. If desired, the compound negative retroreflector of FIG. 5 could be a multi-element device (see FIGS. 7A–7I) if it is required to provide added color correction.

Figure 6:
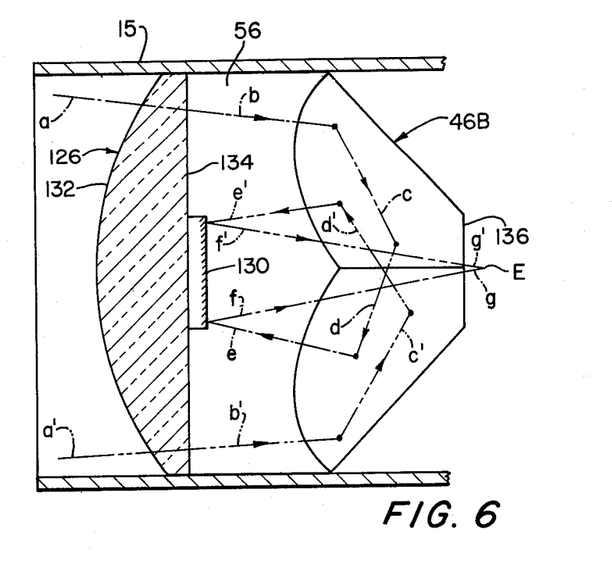
FIG. 6 is a sectional view of another preferred optical system employing a retro-directive reflector.

FIG. 6 illustrates an optical system wherein the housing 15 supports a lens 126 having positive power, a retrodirective corner reflector 46B, and a reflector 130. Lens 126 constitutes an entrance pupil and is characterized by a convex front surface 132 and a reflective rear surface 134 and may be a multi-element lens (not shown). For the simplest arrangement, surface 132 is spherical and surface 34 is flat and at a right angle to the axis of barrel 15. The retrodirective reflector 46B may be either solid as shown or hollow. As previously described, its three converging flat surfaces may be coated with a reflective material to enhance reflection. The element 46B differs from elements 46 in that its apex is truncated so as to form a surface 136 which may be curved or a hole in the case of a hollow retroreflector (not shown). The cylindrical portion 56 of element 46B has a flat end surface which abuts and may be secured to the flat surface 134 of lens 126 by a suitable light-transmitting cement. However, the center section of the end surface of cylindrical section 56 is formed with a cavity to receive reflector 130. The latter may be held in place merely by mutual engagement with lens 126 and the retrodirective reflector 46B or it may be cemented to one or both elements. Preferably, reflector 130 is a flat mirror as shown, but it may be designed so as to provide positive or negative power and to focus the image either at or in front of or behind the aperture formed by the truncated end of element 46B. Reflector 130, which may be integral with lens 126, preferably is circular in cross-section but it may have some other cross-sectional configuration. The image formed by the particular system of FIG. 6 is received by an eyepiece (not shown) located behind and in alignment with element 46B. The eyepiece may be of conventional construction with any suitable magnifying power.

The path of light rays in the system of FIG. 6 is as follows. A light ray $a$ coming from an object passes through lens 126 and proceeds as $b$ through the cylindrical portion 56 of element 46B to one of the latter's flat surfaces, where it is reflected and directed as $c$ to a second one of the flat surfaces of element 46B. The ray then is directed as $d$ to the third flat surface of element 46B where it is reflected and passes as $e$ to reflector 130. From the latter, the ray proceeds as $f$ back into the element 46B from which it emerges as $g$ from the surface (or void) 136 and passes through focal point E to the magnifier or eyepiece (not shown). In the case where 46B is a solid prism, ray $f$ passes through element 46B because its angle of incidence does not exceed the critical angle of reflection of surface 136. The path of a second light ray that converges with the previously described ray at final focal point E is identified by legs $a'$–$g'$. FIG. 6 illustrates that the retrodirective reflector need not be at the "front" of the optical system and also that a feasible objective may be designed according to this invention without having to utilize a main mirror as shown at 30 in FIGS. 2 and 5. If desired, the lens 126 may be annular and concentric with reflector 130. Also the latter may be disposed in a recess in lens 126 instead of in a recess in element 46B, or it may be integral with surface 134.

FIGS. 7A to 7H illustrate certain modifications of the system of FIG. 2.

Figure 7A:
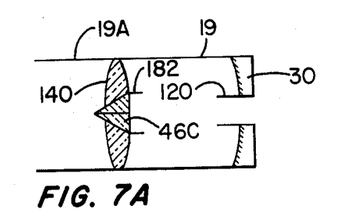
FIGS. 7A–7I are schematic views of other modifications of the invention.

FIG. 7A shows a system wherein the corner cube reflector 46C is mounted within a housing 19 coaxially with a double-convex lens 140, and a tubular stop 120 is attached coaxially to the main spherical mirror 30.

This system may be used advantageously in instruments such as photometers and relatively inexpensive cameras. It is uncorrected for color and hence is intended for use primarily in monochromatic light. It does allow some correction for coma to ease the burden on the eyepiece with which it is used.

Figure 7B:
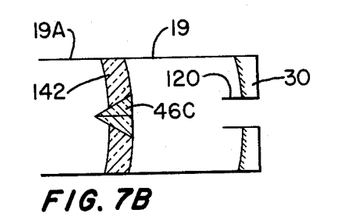

The system of FIG. 7B differs from the system of FIG. 7A in that the corner cube reflector 46C is mounted within and coaxially of a concave-convex (or meniscus) lens 142. This system is useful as a visual device or for large telescopes and microscopes. By way of example, it can be used with a Maksutov-Bouwers concentric system. It has very low color, coma and astigmatism error and is mostly free of spherical aberration.

Figure 7C:
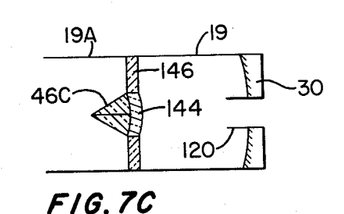

FIG. 7C shows a system wherein the corner cube reflector 46C is attached to a concave-convex lens 144 which is secured to and mounted centrally and axially of a planar lens 146. The system is useful for light weight telescopes and monoculars as well as for large astronomy telescopes. As in FIGS. 7A–7I, that portion 19A of housing 19 which extends forwardly of the corner reflector acts as a stop. Correction for coma and astigmatism is achieved by properly adjusting the length of housing portion 19A. The telephoto erecting secondary may be color corrected in a manner similar to a "Barlow Lens".

Figure 7D:
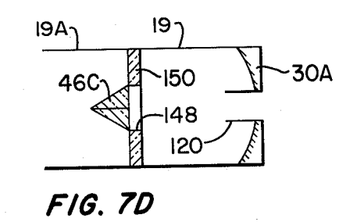

FIG. 7D shows a system wherein the corner cube reflector 46C is mounted coaxially with a central aperture 148 in a planar lens 150, and the spherical main mirror 30 is replaced by a paraboloidal mirror 30A. This system may be used for the same applications as the system of FIG. 7C. By suitably adjusting the length of the front stop 19A, it is possible to remove most coma and astigmatism error. This system has extremely low color error due to plate 150 and corner reflector 46C having zero power.

Figure 7E:
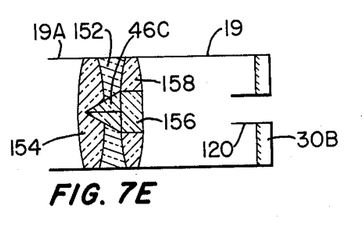
Figure 7F:
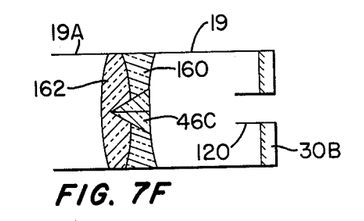

FIG. 7E shows a system wherein the corner cube reflector 46C is disposed in an aperture in a concave-concave lens 152 and has its apex extending into a central cavity in a convex-concave lens 154. The opposite end of reflector 46C is flat and engages a planar lens 156 which is disposed centrally of and in contact with a convex-concave lens 158. Additionally, the main mirror 30 is replaced by a flat main mirror 30B. This system may be used as a camera lens, microscope or a special purpose optical measurement instrument. It is highly corrected for spherical aberration, coma, astigmatism and color, and telephoto magnification is provided by the compound powered prism. Use of a flat primary mirror gives the system thermal stability since all of the power (exclusive of the associated eyepiece) is located at one place. In FIG. 7F the corner cube reflector 46C is disposed in a central aperture in a concave-convex lens 160 and its apex is disposed in a central aperture in a convex-concave front lens 162. The main mirror 30 is replaced by a flat main mirror 30B. This system is useful as a lens system for less expensive instruments and cameras. The doublet permits correction for spherical aberrations and coma, and the front stop 19A removes astigmatism. Use of a flat primary mirror gives the system a high thermal stability since all of the power (exclusive of the associated eyepiece) is concentrated at one location.

Figure 7G:
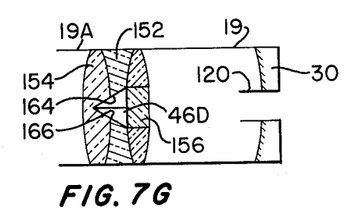

FIG. 7G shows a system like that of FIG. 7E except that the corner reflector 46D is not a solid element but instead is formed by central apertures 164 and 166 of triangular cross-section in lenses 152 and 154. This embodiment may be used as a lens system for cameras or microscopes. Its components can be designed to give the same high degree of correction as the system of FIG. 7E, but with more gentle curvatures at the expense of distributing power along the housing 19. As in FIG. 7E, lens 156 is a telephoto element.

Figure 7H:
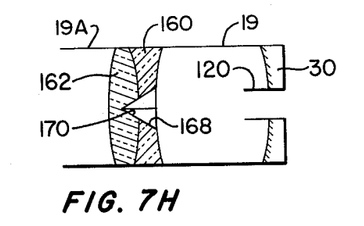

FIG. 7H shows a system like that of FIG. 7F except that the corner cube reflector is not a solid element but instead is formed by central apertures 168 and 170 of triangular cross-section in lenses 160 and 162. A spherical main mirror 30 is also employed. This embodiment may be used as a lens for visual telescopes, viewers, microscopes, and cameras. It offers correction comparable to that achieved with the system of FIG. 7G except that it is lighter since the secondary does not include telephoto element 156. However, the absence of element 156 results in its field being less flat and its overall focal length being shorter in comparison with the system of FIG. 7G.

It is to be recognized also that the systems of FIGS. 7A, B, D and F may be further modified by forming the base of the corner reflector with a concave surface so as to provide magnification in the manner provided by surface 118 of the system of FIG. 5.

Figure 7I:
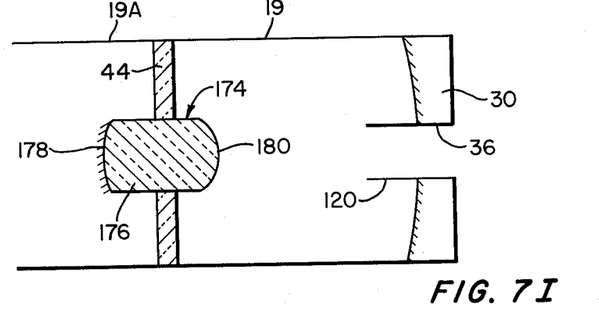

FIG. 7I shows an optical system similar to that of FIGS. 2 and 5 except that the corner cube reflector is replaced by the cat's eye lens 174 which comprises a cylindrical member 176 having a convex front surface 178 that is coated with a reflecting material and a concave rear surface 180. In this embodiment, light reflected from main mirror 30 enters the cat's eye lens 170 via its surface 180, passes through the lens to reflective surface 178, then passes back through the lens and exits from rear surface 180 to a focal point located in line with the central opening 36 of main mirror 30. The image is real and erect. This embodiment may be used as the lens system for visual telescopes, microscopes and large aperture telescopes.

It is to be noted that when any of the systems of FIGS. 7a–I are used with a camera they eliminate the need for the heavy expensive separate erector usually found if single lens reflex cameras or the inconvenience of the upside down image encountered in most so-called "view cameras".

With respect to the system of FIG. 2 where the secondary erector element has no power, the stop protruding from the center of the primary mirror (which effectively consists of barrel 70 and element 90) should normally be no longer than approximately one-third of the focal length of the primary mirror.

In each of the embodiments of FIGS. 5 and 7A–I, the secondary also may be provided with a glare stop, as exemplified by the tubular stop 182 in FIG. 7A to eliminate stray light. It is to be noted also that the retrodirective reflector may be supported by a spider (not shown) in place of plate 44. The term "spider" is employed to denote a support structure which consists of a plurality of spaced support arms extending between and connected to the retrodirective reflector and the surrounding housing. The support arms may be opaque, in which case the number and width of the arms must be set so as to provide minimum light interference. Preferably, however, the supports arms are transparent and have flat front and rear surfaces. Additionally, the support arms may be made jagged or undulative to suppress diffraction patterns as is well known in the art.

The optical systems of the present invention, and particularly the embodiments shown in FIGS. 2 and 5, are particularly suited for visual aid instruments with magnification of between 4 and 10 power. However, the invention is also useful for other applications requiring more or less power. In general, the primary mirror should be no "faster" than about $f/1.0$ nor "slower" than about $f/10$. However, to be practical as an instrument to be worn in the manner of spectacles, the primary mirror or objective lens should be between about $f/1.5$ and about $f/4$. Also, the entrance aperture is preferably located at least as far from the primary mirror as the primary focal point and not further from the primary mirror than its center of curvature, in order to curtail the effects of coma aberration and astigmatism. With respect to visual instrument applications such as the spectacle-type arrangement of FIG. 1, the diameter of the image of the secondary blockage (i.e., the retroreflector) should be no greater than about 7/10ths of the entrance pupil of the eye under the conditions under consideration, e.g., about 1.4 millimeters for an eye with an entrance pupil of about 2.0 millimeters. Also, under no condition should the blockage of the secondary exceed the diameter of the entrance pupil of the eye.

Table I below lists the design data for a preferred example of a catadioptric system as shown in FIG. 2 wherein all optical elements are made of glass. As is customary in the art, the absence of a sign in front of numerical values indicates plus value and signifies that a surface is convex to object (i.e., to the left in FIG. 2), while a minus sign indicates that a surface is concave to the object.

TABLE I

| Surface | Radius | Thickness | Refr. Index | Abbe No. |
|---|---|---|---|---|
| A | Flat | 0.0000 | 1.00000 | 0.00 |
| B | Flat | .1000 | 1.51872 | 63.96 |
| C | −5.0189 | 1.0994 | 1.000 (air) | 0.00 |
| D | Flat | −1.0994* | −1.000 (air) | 0.00 |
| E | Flat | 1.0262** | 1.51872 | 63.96 |
| F | −.4327 | .8897 | 1.000 (air) | 0.00 |
| G | .3418 | .0402 | 1.72311 | 29.29 |
| H | −.3919 | .1655 | 1.62286 | 60.08 |
| I | −9.513 | .0019 | 1.000 (air) | 0.00 |
| J | −.6416 | .1107 | 1.62286 | 60.08 |
| K | 2.349 | .0019 | 1.000 (air) | 0.00 |
| L | −.4476 | .1135 | 1.53317 | 61.92 |

TABLE I-continued

| Surface | Radius | Thickness | Refr. Index | Abbe No. |
|---------|--------|-----------|-------------|----------|
| M | −.5479 | .0453 | 1.76859 | 26.31 |

Focal Length of Primary = 2.5095 inches
Relative Aperture of Primary ≈ f/2.5
Field of View = 6°
Magnifying Power = 6
Aperture = 25.4 mm or 1 inch
T Number ≈ T/3.4
*Negative value here indicates the change of direction after reflection
**1.0262 is total effective glass thickness and equals twice the real thickness of the combined prism and plate (since the light is reflected and traverses real thickness twice)

An object constructed in accordance with the foregoing design criteria is substantially fully corrected for spherical and chromatic aberrations as well as for coma, distortion and astigmatism. Furthermore, the field of view is non-vignetted. It is to be noted also that the system is afocal since it does not come to focus but only recollimates light rays. Hence it has no focal length in the normal sense but only a magnification. The image formed by the primary mirror is recollimated by the eyepiece (in this case, at the smaller diameter).

A preferred example of the embodiment of FIG. 5 comprises a system having the following design criteria:

(1) the spherical primary mirror has an outsude diameter of 1.22 inches, a center hole with a diameter of 0.45 inch, a vertex thickness of 0.125 inch, and a focal length of 2.2204 inches;

(2) the solid corner cube has a curved surface as shown at 118 with a diameter of 0.4 inch and a radius of curvature of 9.5028 inches;

(3) the solid corner cube has a vertex thickness, i.e., the thickness measured from the apex of the corner cube to the center of surface 118, of 0.5005 inch;

(4) the corner cube has a thickness measured between its apex and a plane which is common to all points on the rim of its surface 118 of 0.5026 inch;

(5) the distance between the vertex of surface 118 and the vertex of the primary mirror is 1.1519 inch;

(6) the prism and primary mirror are made of Schott BK-7 glass having an $N_D$ of 1.5168; and (7) the internal diameter of the housing 15 is tapered and measures 1.0 inches at the entrance aperture, i.e. at the location of plate 44.

A system constructed according to the foregoing design criteria has an aperture of 25.4 mm (i.e. 1.0 inch) with a real field of veiw of 6°, and will exhibit an approximate magnification power of 6X when used with an eyepiece having a focal length of 10.311 mm. The focus of the system, i.e., $F_3$, is located 0.4743 inches from the vertex of curved surface 118 and the image will be real and erect and be substantially free of spherical and chromatic aberrations as well as being substantially fully corrected for coma, distortion and astigmatism. It is to be noted also that proper design of the curvature of surface 118 not only provides color correction but also permits a reduction in the size of the corner cube prism. This system makes it possible to provide an instrument light enough to wear and less than 2 inches long with fields of view of from 6° to 9° and power ranges of 4X to 10X.

It is to be noted that for the several embodiments shown in FIGS. 1–5 and 7A–7I, the corner cube should be sized so that the linear obstruction which it produces does not exceed about 0.4 of the entrance aperture diameter of the system, in order to obtain an optimum balance of minimum of color and other aberrations, short primary focal length, long overall system focal length, and short system physical length.

The present invention has a number of advantages. The main advantage is that little or no refractive material must be traversed by the light during erection (this is particularly true with the system of FIGS. 2 and 5); hence, little or no color aberration is introduced by the erecting process. This advantage is not present with conventional prism-type erecting systems. Secondly, the invention provides an improved performance capability for large aperture telescope systems by virture of allowing high performance across relatively large field angles without the use of a full aperture corrector plate or lens such as is required in a Schmidt or a Maksutov-Bouwers Meniscus System. The invention allows this high (usually diffraction limited across a field of 6° or more) performance to be obtained without excessively tight tolerances on any of the parameters of the system. This benefit accrues mainly from the fact that the image can be erected and magnified by a single element. Still another advantge accrues from the fact that any mis-centering in mountng the retroreflector erector causes only a change in the location of the field of view and introduces no aberrations, whereas in any other system involving Cassegrainian or Gregorian focus aberrations rise very quickly with mis-centering of the secondary (it should be noted that this advantage does not accrue if the retroreflector is a cat's eye lens or when power is introduced at the secondary). It is to be appreciated that the optical systems of the present invention may be aligned by varying the centering of the erector by any of several well known techniques, e.g., by means of rotatable eccentric mounts or centering screws.

It is to be noted also that the use of a retrodirective reflector provides a simple method of obtaining an erect image at little or no cost of light gathering ability. Another advantage is that since an erect image is achieved with no intermediate image where the secondary is a corner reflector, a fewer number of elements are required than in prior systems. Thus, for example, no intervening erector lens is required. The system also has a relatively long focal length, with the result that less of a burden is placed on the eyepiece for a given magnification. Furthermore, as compared to many prior systems, the light rays travel through at angles which are considerably less steep with respect to the optical axis, so that gentler curvaturs are requird in the lenses of the eyepiece and in whatever lenses may be included in the objective system. As a consequence, and since the retrodirective reflector also has relatively loose angular manufacturing tolerances, the optical elements are easier to fabricate. Furthermore, it is not necessary (except to improve performance) to coat the surfaces of the solid triple mirror reflectors, i.e., the cube prism corner reflectors, with a reflecting material such as silver since these are essentially total reflection prisms and thus have low losses.

A further advantage resides in the fact that the objective may be made with unity magnification for certain applications, with the desired degree of magnification being designed solely into the eyepiece. Thus, no aberrations of any sort are introduced by the objective. Since the retrodirective reflector is relatively insensitive to mis-centering and tilt, and also because relatively few optical surfaces and field planes are involved, the system has fewer alignment criteria than many prior systems and thus is less difficult to assemble and align and will not become grossly misaligned if it is dropped (as is likely when being handled by persons with greatly reduced vision since such persons are prone to such mishaps). This is of particular significance in a system which is required to be used under adverse environmental circumstances such as shock or vibration. The retrodirective reflector in a boon in this respect for it provides image stabilization, a particularly critical requirement in telescopes. Also, the eased constraints on the objective system means higher overall resolution, and a larger field of view (e.g., from about 6° in the case of a higher power instrument to as great as 10° or more in the case of a lower power instrument), and permits use of thinner, lighter weight optical elements. A further cost and weight advantage is gained if the elements are molded of plastic.

Since the retrodirective reflector is not alignment critical, it may be made movable relative to the main mirror (as in FIG. 2) so as to be used for focusing, whereby the eyepiece (which is more alignment critical) may be rigidly mounted. In this respect it is also recognized that varying the centering of the retrodirective reflector provides a simplified means of system alignment. Alternatively, the retrodirective reflector may be fixed relative to the main mirror and adjustable eyepieces may be used. In this connection it is to be noted that a pair of binoculars constructed in accordance with this invention have far fewer precision angulr optical surfaces than a pair of conventional prism binoculars.

In terms of telephoto objectives for cameras and the like, or a pair of binoculars designed to be worn as spectacles, the system has the advatage of shorter physical length and lighter weight, with a low overhung moment since the center of gravity is closer to the rear end of the optical system, i.e., closer to the eyepiece in most of the cases shown. In this connection it is to be noted that since no full aperture corrector plate is required in the preferred form of the invention illustrated in FIG. 2, most of the mass of the system is concentrated near the primary mirror. The only mass of any significance located forward of the primary mirror is the retroreflector (which is light and small) and the means for mounting the retroreflector. Any light stop or glare shield associated with the primary or secondary need have little mass to be functional. Hence, the center of gravity of the system is quite close to the main mirror. Also the moment of inertia of the system can be much lower than in most known systems of similar intent. This is quite important in the case of systems that must be dynamically slewed or controlled, e.g., as part of a moving assembly in a servosystem. The large dynamic range of focussing that is permissible also makes it feasible to employ the invention as a reading and slighting aid for those with a reduced vision problem. Another advantage is that the system not only provides a useful field of 6° or greater but also forms an erect magnifield image for an eye which is focused for a distant object, i.e., an eye which is relaxed and hence has low susceptibility to fatigue.

The invention may also employ an aspherial main mirror and may be used in either a convergent or divergent beam of light. Also, the main mirror 30 in FIGS. 2, 5, 7A-D, 7G and 7H may be a Mangin mirror. Furthermore, in the system of FIGS. 2, 5 and 7A-H, a positive doublet may be located in advance of the corner reflector, i.e., so that the corner reflector is between the added doublet and the main mirror. In such case, of course, the positive doublet (and not, for example, the zonal portion of plate 44) is the entrance pupil. It also is contemplated that a reflective rather than a refractive eyepiece or magnifier may be used and the image need not be formed within the system but instead could be formed behind the reflective eyepiece.

It is contemplated also that in the embodiments of FIGS. 1–5 and 7A–I the apex of the corner cube may be truncated to facilitate molding the cube, reduce scattering and also to reduce stress concentrations which tend to deform or crack a pointed apex. The apex may be truncated to a flat surface which extends at the right angle to the center axis or it may be merely rounded. In either case, the surface formed by the truncating is preferably roughened (e.g., by coarse grinding) and/or coated with a light absorptive medium, e.g. black paint, to reduce light scattering. The truncation should be limited so that less than about 10% of the light entering the prism from the main mirror is absorbed at the truncated apex.

With respect to the system of FIG. 6, it is to be appreciated that the retrodirective reflector 46B may be spaced from lens 126 and may have a front surface that is convex like surface 132 of lens 126. It also is contemplated that the rear surface 136 may be curved instead of flat, e.g., surface 136 may have a spherical curvature like surface 118 of the system of FIG. 5. Also the lens 126 need not be formed separately but instead may be an integral portion of the retrodirective reflector, in which case the lens 126 would have a center aperture to accomodate a separate mirror element comprising the reflector 130. It is to be appreciated also that two systems as shown in FIG. 6 may be used in parallel to provide a binocular optical system, e.g., a spectacle system similar to the system represented in FIG. 1.

A further possible modification is to make different optical elements of different optical materials, e.g., lens 126 and corner reflector 46B may be made of materials with different indices of refraction.

Other advantages and modifications will be obvious to persons skilled in the art from the foregoing description.

What is claimed is:

1. An optical system comprising:
  a corrected lens mounted coaxially in front of a truncated retrodirective reflector, said lens having a reflective central portion so positioned as to receive light reflected from the truncated retrodirective reflector and redirect the light through the truncated portion of the retrodirective reflector.

2. An optial system according to claim 1 wherein said central reflective portion is so curved as to bring the light to focus prior to reaching the truncation aperture.

3. An optical system according to claim 1 wherein said central reflective portion is so curved as to bring light to focus after reaching the truncation aperture.

4. An optical system according to claim 1 including an eye piece to magnify the image.

5. A device according to claim 1 wherein the retrodirective reflector is also a refractor.

6. A device according to claim 5 wherein the retrodirective reflector has a curved surface on the side nearest the object.

7. A device according to claim 5 wherein the retrodirective reflector has a curved surface on the side farthest from the object.

8. A device as in claim 1 wherein said lens and said retroreflector are integral with one another.

9. A binocular telescope comprising two systems as defined in claim 1 disposed adjacent to one another with their optical axes being substantially parallel to and spaced from one another.

10. An optical system comprising an entrance pupil, a main mirror in the form of a truncated corner reflector disposed so that its base faces said entrance pupil, and a secondary mirror, said entrance pupil and said mirrors being arranged so that said main mirror receives light passed by said entrance pupil and reflects it back to said secondary mirror and said secondary mirror reflects said same light back through the truncated section of the main mirror.

11. An optical system according to claim 10 wherein said entrance pupil is in the form of a refractive medium.

12. An optical system according to claim 11 wherein said secondary mirror is a flat mirror.

13. An optical system according to claim 11 wherein said secondary mirror is sandwiched between said refractive medium and said main mirror.

14. An optical system according to claim 11 wherein said corner reflector is a solid.

15. An optical system according to claim 11 wherein said corner reflector engages said refractive medium.

16. An optical system according to claim 11 wherein said refractive medium is a positive lens.

17. An optical system according to claim 11, and a second like optical system disposed in parallel therewith.

* * * * *